United States Patent
Kang et al.

(10) Patent No.: US 8,660,580 B2
(45) Date of Patent: Feb. 25, 2014

(54) METHOD OF PROVIDING LOCATION-BASED SERVICE USING LOCATION INFORMATION OF MOBILE TERMINAL

(75) Inventors: Hyun-joo Kang, Suwon-si (KR); Young-ho Rhee, Seoul (KR); Il-ku Chang, Seoul (KR); Ju-youn Lee, Seongnam-si (KR); Eun-jung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 12/566,828

(22) Filed: Sep. 25, 2009

(65) Prior Publication Data

US 2010/0178939 A1 Jul. 15, 2010

(30) Foreign Application Priority Data

Jan. 12, 2009 (KR) ........................ 10-2009-0002402

(51) Int. Cl.
*H04W 24/00* (2009.01)

(52) U.S. Cl.
USPC .................. 455/456.3; 455/456.1; 455/456.2; 455/456.6; 455/457

(58) Field of Classification Search
None
See application file for complete search history.

(56) References Cited

U.S. PATENT DOCUMENTS

| | | | |
|---|---|---|---|
| 7,039,427 B2* | 5/2006 | Tachikawa | 455/457 |
| 7,158,805 B1* | 1/2007 | Park et al. | 455/519 |
| 7,801,542 B1* | 9/2010 | Stewart | 455/518 |
| 2004/0041836 A1 | 3/2004 | Zaner et al. | |
| 2005/0159970 A1* | 7/2005 | Buyukkokten et al. | 705/1 |
| 2006/0121988 A1 | 6/2006 | Reville et al. | |
| 2007/0021142 A1 | 1/2007 | Byeon | |
| 2007/0112922 A1* | 5/2007 | Kurata et al. | 709/206 |
| 2007/0204218 A1* | 8/2007 | Weber et al. | 715/530 |
| 2007/0218900 A1 | 9/2007 | Abhyanker | |
| 2008/0070593 A1* | 3/2008 | Altman et al. | 455/457 |
| 2008/0114834 A1 | 5/2008 | Miyazaki | |
| 2008/0132243 A1* | 6/2008 | Spalink et al. | 455/456.1 |
| 2008/0155632 A1 | 6/2008 | Marilly | |

FOREIGN PATENT DOCUMENTS

| | | |
|---|---|---|
| JP | 2002-082894 | 3/2002 |
| JP | 2002-230137 | 8/2002 |
| JP | 2004-164599 | 6/2004 |
| JP | 2004-246710 | 9/2004 |
| JP | 2005-303848 | 10/2005 |
| JP | 2007-287131 | 11/2007 |
| JP | 2007-323311 | 12/2007 |
| JP | 2007-328723 | 12/2007 |
| JP | 2008-0123233 | 5/2008 |
| KR | 10-2006-0063645 | 6/2006 |
| KR | 10-2007-0013069 | 1/2007 |
| KR | 10-2008-0058281 | 6/2008 |
| KR | 1020080078333 | 8/2008 |

* cited by examiner

*Primary Examiner* — Suhail Khan
(74) *Attorney, Agent, or Firm* — NSIP Law

(57) ABSTRACT

Disclosed is a location-based service method using location information of a mobile terminal in a mobile communication system. In a location-based service providing method, second mobile terminals within a predetermined range of a first mobile terminal are searched for, status information and relative location information of one or more second mobile terminals found is collected, and display data comprising the relative locations and status information of the one or more second mobile terminals found is sent to the first mobile terminal.

21 Claims, 12 Drawing Sheets

METHOD OF PROVIDING LOCATION-BASED SERVICE USING LOCATION INFORMATION OF MOBILE TERMINAL

CROSS-REFERENCE TO RELATED APPLICATION

This application claims the benefit under 35 U.S.C. §119 (a) of a Korean Patent Application No. 10-2009-0002402, filed Jan. 12, 2009, the entire disclosure of which is incorporated herein by reference in its entirety for all purposes.

BACKGROUND

1. Field

The following description relates to a communication service, and more particularly, to a method of providing a location-based service using location information of a mobile terminal.

2. Description of the Related Art

A social network service (SNS) is a participatory service which provides a user with a networking environment in which the user can build an online social network. Examples of SNS include FACEBOOK®, MYSPACE®, TWITTER®, LINKEDIN®, and the like.

Recently, SNSs are being provided in a mobile communications system. An example is a location-based SNS to provide a mobile terminal with information about other mobile terminals based on a current location of the mobile terminals. For example, the location-based SNS provides a user of a mobile terminal with information about locations and statuses of other mobile terminals which are currently receiving the same SNS, thereby establishing an environment under which users using the same SNS can interact with each other.

However, in conventional location-based SNSs, because a user interface of a mobile terminal shows information about other mobile terminals in a very simple form, for example, in the form of a list, or shows only the locations of the other mobile terminals that are set to have specific connections with the mobile terminal, service users may have difficulties in recognizing information on locations or statuses of the other mobile terminals.

SUMMARY

In one general aspect, there is provided a method of providing a location-based service using location information of a mobile terminal, the method including searching for second mobile terminals within a predetermined first range of a first mobile terminal, and collecting status information of one or more second mobile terminals that are found, and providing display data to the first mobile terminal, the display data comprising relative location information together with the status information of the one or more second mobile terminals found.

The status information may include service connection statuses or relationship types between the one or more second mobile terminals found and the first mobile terminal, and the one or more second mobile terminals found may be displayed in different forms according to the service connection statuses or the relationship types.

The service connection statuses or the relationship types may be distinguished by using different colors.

The method may further include providing data to display emotion information of a user or users of the one or more second mobile terminals found, wherein the emotion information is set by the user or users of the one or more second mobile terminals found.

The emotion information may be distinguished by using different icons.

The method may further include providing data to display information about one or more programs which are being executed on the one or more second mobile terminals found.

The method may further include providing data to provide a menu on the first mobile terminal, the menu adapted to allow a user to select an application program for an interaction with the one or more second mobile terminals found.

The method may further include, in response to selecting at least one mobile terminal from among the one or more second mobile terminals found, providing information to the first mobile terminal about the at least one selected mobile terminal.

The method may further include searching, according to a user's selection of the first mobile terminal, for third mobile terminals which are within a second range of the first mobile terminal, the second range being larger than the first range, and collecting status information of one or more third mobile terminals that are found, and providing display data to the first mobile terminal, the display data comprising relative location information together with the status information of the one or more third mobile terminals found.

In another general aspect, there is provided a method of receiving a location-based service using location information of a mobile terminal, the method including requesting by a first mobile terminal, the location-based service, and receiving by the first mobile terminal, display data corresponding to one or more other mobile terminals, the display data comprising data to display relative location information together with status information of the one or more other mobile terminals, wherein the one or more other mobile terminals being within a first predetermined range of the first mobile terminal.

The method may further include receiving by the first mobile terminal, display data corresponding to one or more other mobile terminals within a second predetermined range of the first mobile terminal, the display data comprising data to display relative location information together with status information of the one or more other mobile terminals within the second predetermined range of the first mobile terminal.

The status information may include service connection statuses and relationship types between the one or more other mobile terminals and the first mobile terminal, and the method may further include displaying the one or more other mobile terminals in different forms according to the service connection statuses or the relationship types.

The method may further include displaying emotion information of a user or users of the one or more other mobile terminals, wherein the emotion information is set by the user or users of the one or more other mobile terminals.

The method may further include displaying a menu to select an application program for an interaction with the one or more other mobile terminals.

In still another general aspect, there is provided an apparatus configured to provide a mobile terminal a location-based service using location information of another mobile terminal, the apparatus including a location ascertaining unit to search other mobile terminals within a predetermined range of the mobile terminal, an information collecting unit to collect status information of one or more other mobile terminals that are found, and a service providing unit to provide display data to the mobile terminal, the display data comprising the status information together with relative location information of the one or more other mobile terminals found.

In yet another general aspect, there is provided an apparatus configured to allow a mobile terminal to receive a location-based service using location information of another mobile terminal, the apparatus including a screen outputting unit to receive display data, the display data comprising display status information together with relative location information of one or more other mobile terminals within a first predetermined range of the mobile terminal, and to display a display corresponding to the display data, and a controller to control a process of providing the display data.

The screen outputting unit may receive display data corresponding to one or more other mobile terminals within a second predetermined range of the first mobile terminal, the display data comprising data to display relative location information together with status information of the one or more other mobile terminals within the second predetermined range of the first mobile terminal.

Other features and aspects will be apparent from the following detailed description, the drawings, and the claims.

Figure 1:
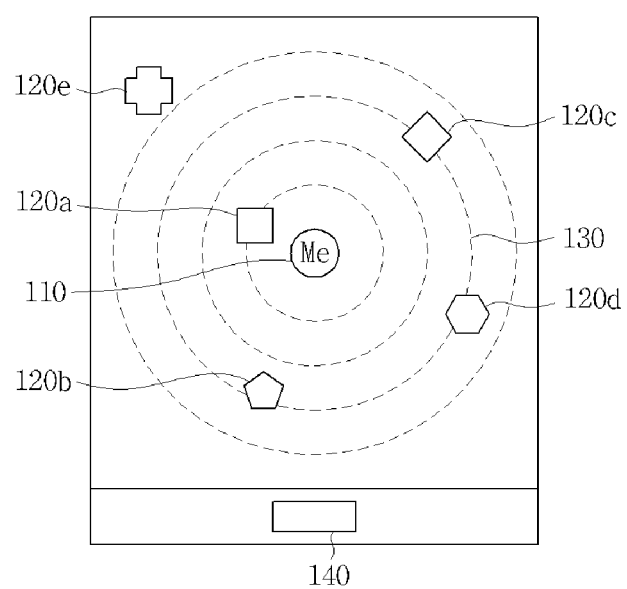
FIG. 1 is a diagram of a display providing a location-based service, according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

As referred to herein, a display may comprise a screen, a monitor, a video monitor, a digital display, or other display device.

FIG. 1 illustrates a display providing a location-based service, according to an exemplary embodiment.

Referring to FIG. 1, a plurality of concentric circles 130 are drawn with predetermined radiuses from, and centered on, a user's mobile terminal 110 (hereinafter referred to as "Me" for convenience). Me 110 receives a service, and other mobile terminals 120a, 120b, 120c, 120d, and 120e that are nearby and displayed around Me 110. The number of other mobile terminals that are to be displayed may be set by a user. For example, the number of other mobile terminals that are to be displayed together may be set by a user of Me 110 to 5, 10, 20, 50, or other desired number. Information about the other mobile terminals may be provided for in the current zone which is included inside a predetermined distance from Me 110.

The location-based service providing display may further display a program execution menu 140. The program execution menu 140 may be a menu allowing the execution of various application programs, for example, communications, providing of detailed information, transmission of messages, and the like. The application programs may be associated with another mobile terminal that may be selected by a user.

A second group of other mobile terminals may be searched for, according to a user's selection, wherein the second group is a group of other mobile terminals in a zone that is second nearest to Me 110. For example, 5, 10, 20, 50, or other desired number of other mobile terminals in a specific distance range from Me 110, may be searched for and displayed.

Icons indicating the mobile terminals 120a, 120b, 120c, 120d, and 120e may be displayed together with, for example, their service connection statuses, relationship types, and/or emotion statuses. The service connection statuses, relationship types, and/or emotion statuses may be distinguished, for example, by using different colors, shapes, sizes, and the like. The icons indicating the mobile terminals 120a, 120b, 120c, 120d, and 120e may be displayed together with information associated with programs, applications, and/or services that are currently being executed by the mobile terminals 120a, 120b, 120c, 120d, and 120e.

Figure 2:
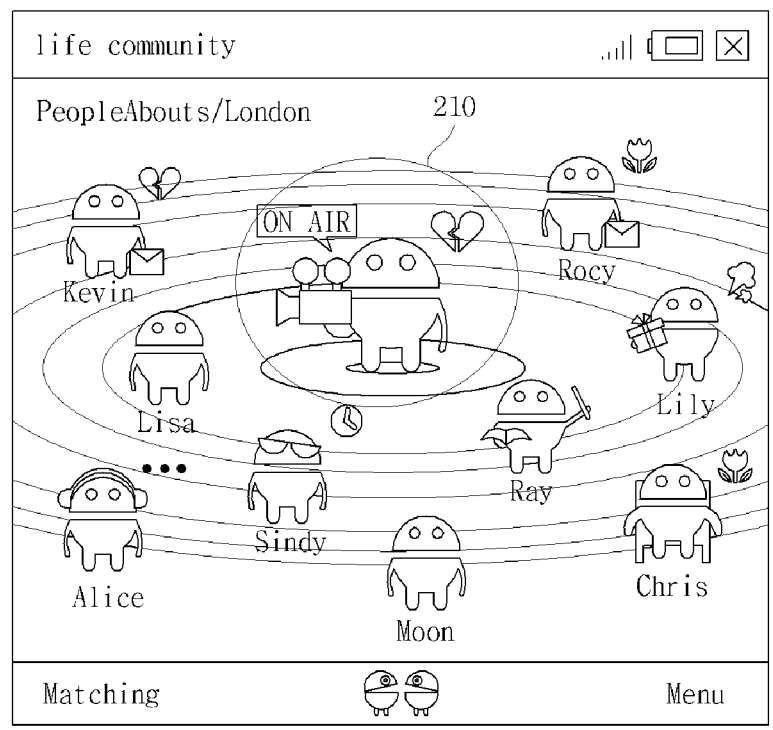
FIG. 2 is a display illustrating a location-based service, according to an exemplary embodiment.

FIG. 2 illustrates an exemplary display of a location-based service, according to an exemplary embodiment.

Referring to FIG. 2, Me 210 is positioned at, for example, the center of the screen, and users of other mobile terminals nearby Me 210 are displayed to be easily distinguishable character icons. Character icons positioned around Me 210 indicate other found mobile terminals. The character icons may reflect one or more user's activities and emotions that may be set by the corresponding users.

Figure 3:
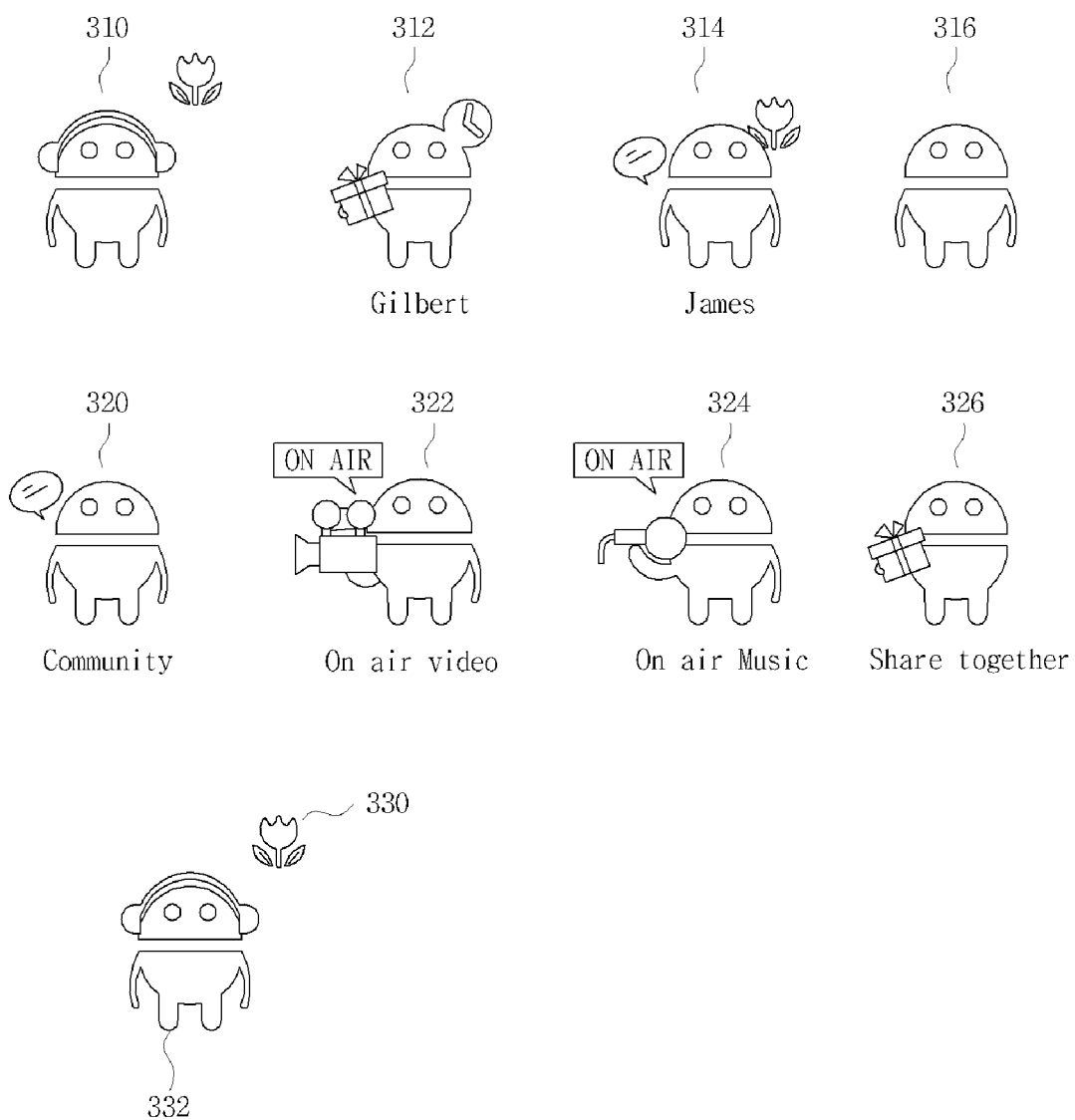
FIG. 3 illustrates various examples of icons that may be displayed on the display of a mobile terminal providing a location-based service.

FIG. 3 illustrates various examples of icons that may be displayed on a mobile terminal providing the location-based service.

The icons may be distinguished by using different colors. For example, Me 310 may be indicated by a red icon, and a buddy which the user knows may be indicated by an orange icon. Other mobile terminals that the user has no acquaintance with may be indicated by purple icons, and users which are not currently connected to the service may be indicated by gray icons. These colors may be changed by a user or service provider.

Information about a program which is currently being executed may be displayed in the form of a small icon or text. For example, where a community service is being executed 320, where a video is on air 322, where music is on air 324, where data is shared with another mobile terminal 326, and the like, may be displayed by differentiating icons or text.

Each icon may be displayed together with a small icon 330 indicating an emotion status. For example, if there is no small icon, this may represent that no emotion status is set, a flower icon may represent that the corresponding user is in a pleasant mood, and a cloud icon may represent that the corresponding user is angry.

Figure 4:
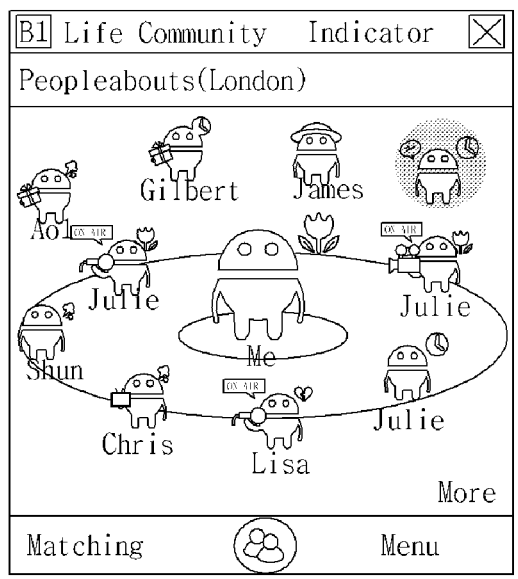
FIG. 4 illustrates examples of various icons and information that can be provided to a user and the user can interact with the icons and information.
Figure 4:
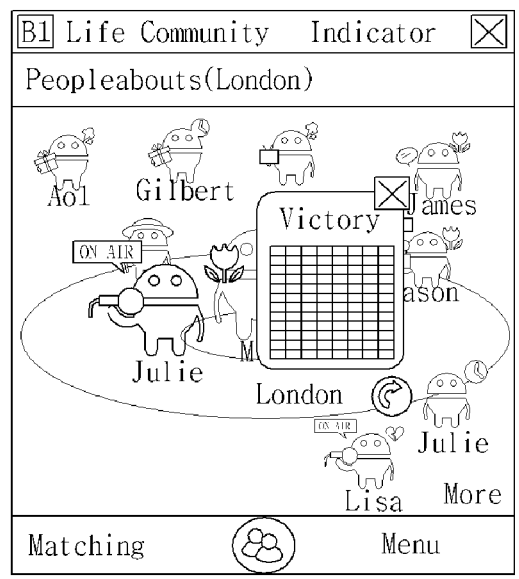
Figure 4:
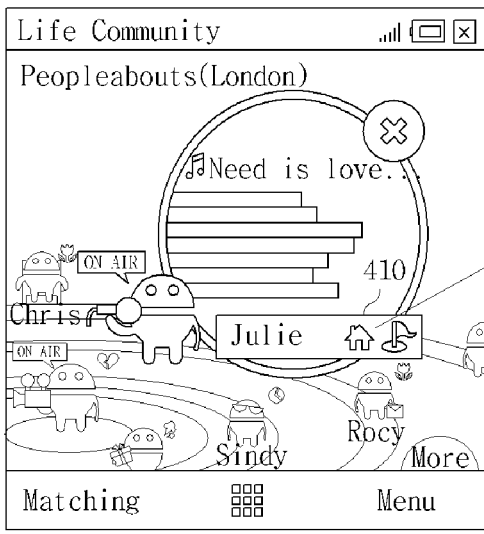
Figure 4:

FIG. 4 illustrates examples of various icons and information that can be provided to a user and the user can interact with the icons and information.

By selecting and enlarging a user's icon, it may be easier to see that a user's mobile terminal is now on air music. By enlarging a user's icon other features may be displayed, for example, the name of the music file currently being on air, the user's ID, an icon linking to a home page, an icon or text indicating a current location defined by the user, and the like, may be additionally displayed. If the icon linking to the home page is selected, the screen may move to a page on which a profile of the selected user is provided.

Figure 5:
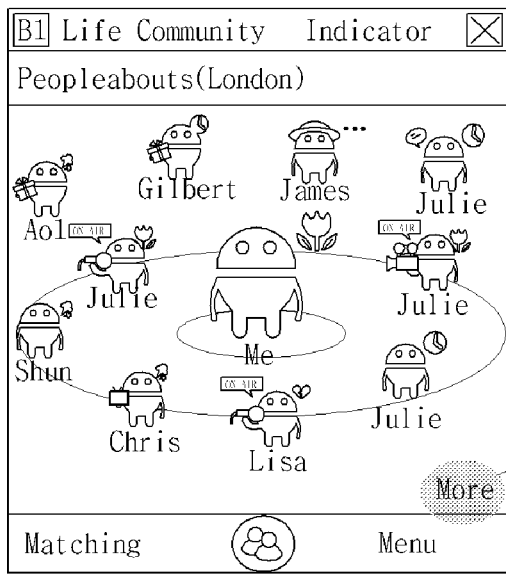
FIG. 5 illustrates exemplary displays showing users of mobile terminals within a second predetermined range selected by a user.
Figure 5:
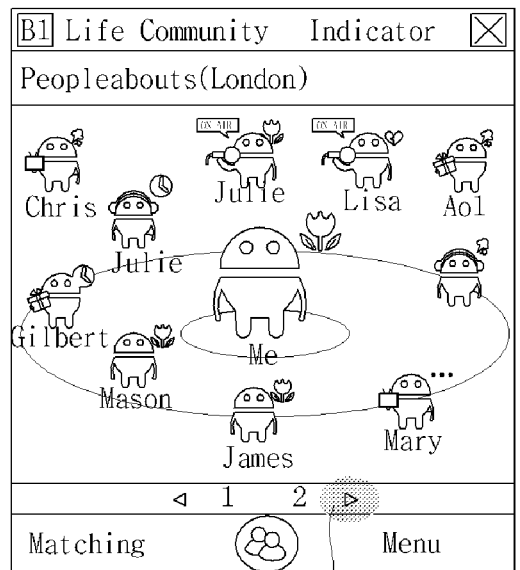

FIG. 5 illustrates exemplary displays showing users of second mobile terminals within a second predetermined range selected by a user.

A user may select a button 510 or 520 to search for other mobile terminals that are less close to the user than the mobile terminals currently displayed. For example, a user may search for other mobile terminals that are in a second nearest zone to Me, and any found other mobile terminals may be displayed in the form described above with reference to FIG. 2.

Figure 6:
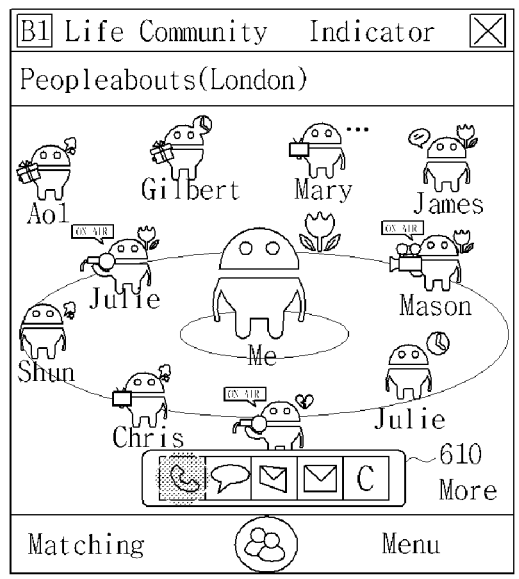
FIG. 6 illustrates exemplary displays to show a program execution menu.
Figure 6:
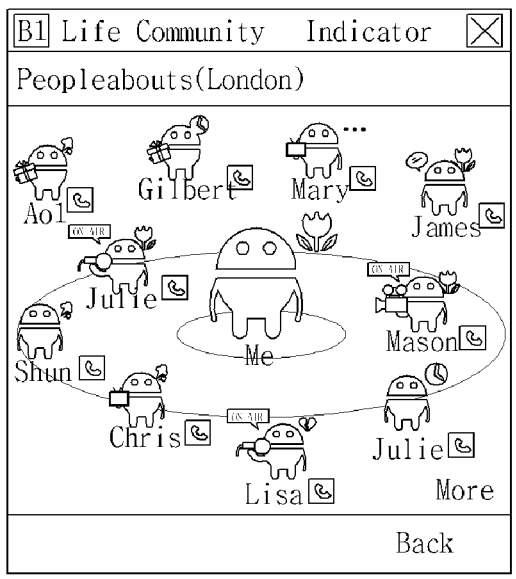

FIG. 6 illustrates exemplary displays to show a program execution menu 610.

The exemplary location-based service providing display described above may further provide the program execution menu 610. The program execution menu 610 may be a menu allowing executing of various application programs, for example, communications, providing of detailed information, transmission of messages, and the like, associated with another mobile terminal that may be selected by a user.

For example, if the user clicks a communication icon, pop-up boxes appear which can perform communication. The pop-up boxes allow the user to contact people nearby through SMS, e-mail, voting, rolling paper, schedule sharing, invite to community, make friends, and the like.

Figure 7:
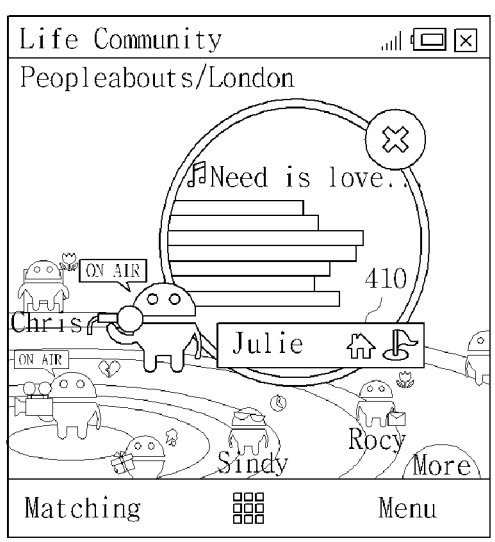
FIGS. 7 and 8 illustrate exemplary displays that provide detailed information about users of other mobile terminals, according to a user's selection.
Figure 7:
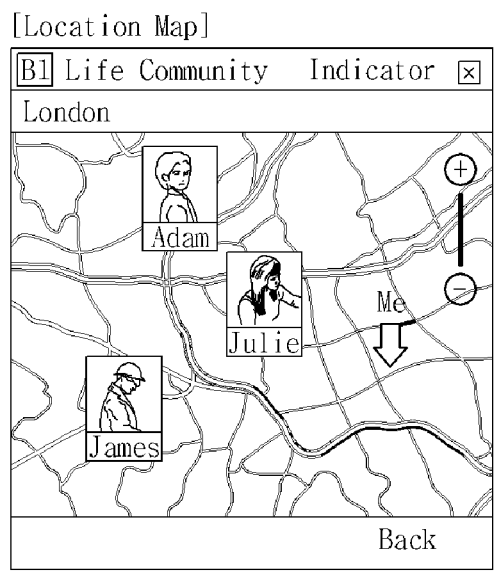
Figure 8:
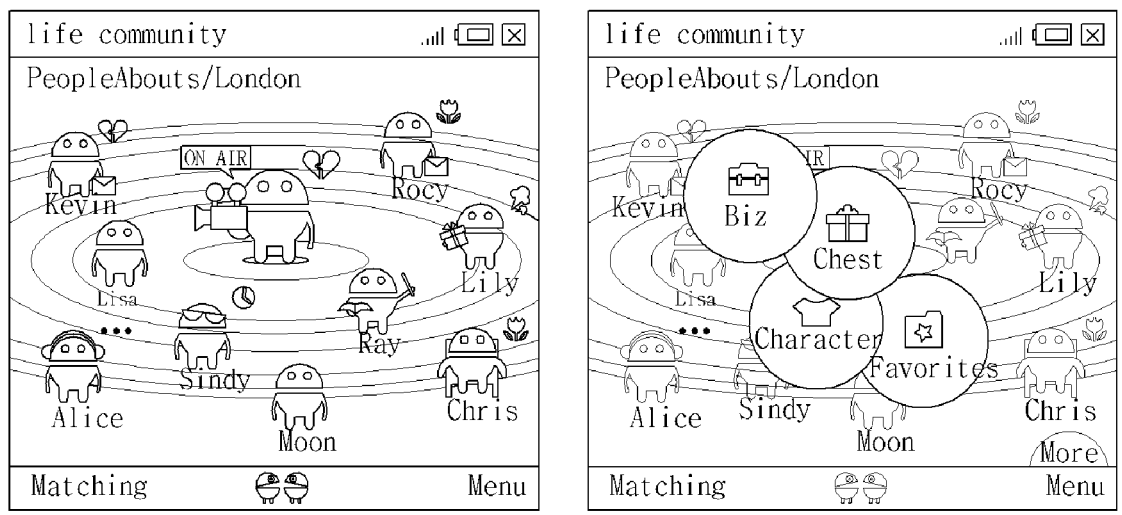

FIGS. 7 and 8 illustrate exemplary displays that provide detailed information about users of other mobile terminals, according to a user's selection.

As illustrated in FIG. 7, if the user selects a mobile terminal and clicks a location icon of the selected mobile terminal, the user may check the location of the selected mobile terminal on a map. As illustrated in FIG. 8, a function of recommending matched people in consideration of business, character, favorite music, favorite movies, physical details, and the like, may be input by a user, and a result may be provided to the user. This can allow, for example, the user to meet persons having the same taste as him or her at a location where the user is currently positioned.

Figure 9:
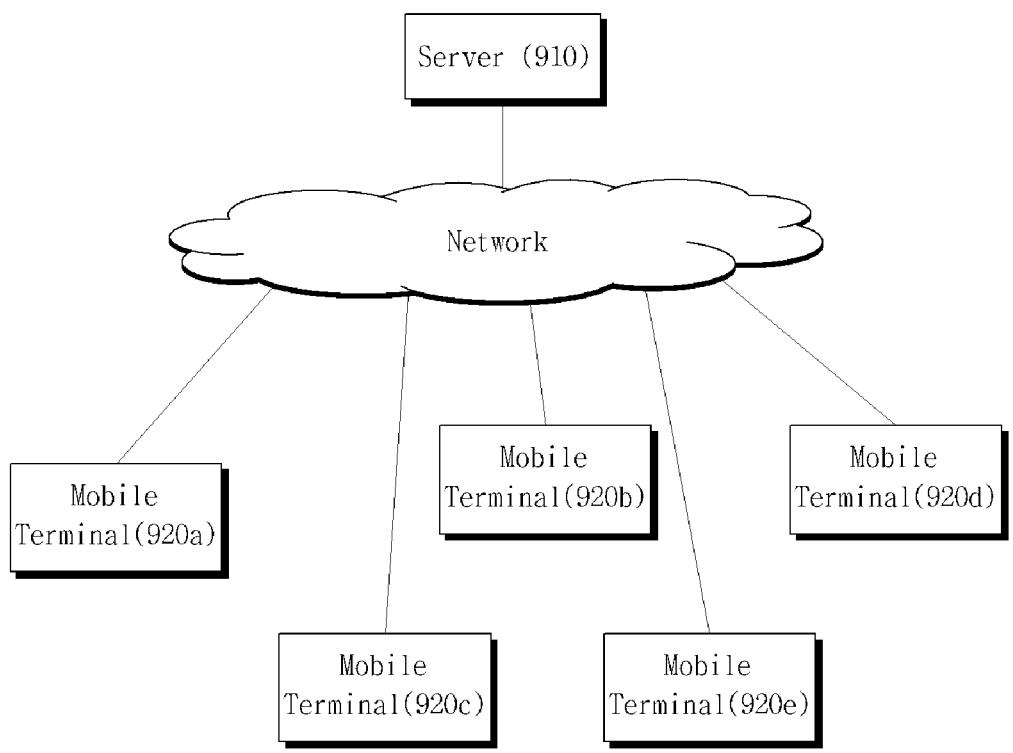
FIG. 9 is a diagram illustrating a service providing network, according to an exemplary embodiment.

FIG. 9 illustrates a service providing network, according to an exemplary embodiment.

Providing of the location-based service, as described above, may be performed by a server 910. Referring to FIG. 9, the mobile terminal 920a receives a location-based information service associated with other mobile terminals 920b, 920c, 920d, and 920e. Likewise, any of the other mobile terminals 920b, 920c, 920d, and 920e may receive a location-based information service associated with the mobile terminal 920a. Server 910, and mobile terminals 920a, 920b, 920c, 920d, and 920e, can be in communication via a network.

Figure 10:
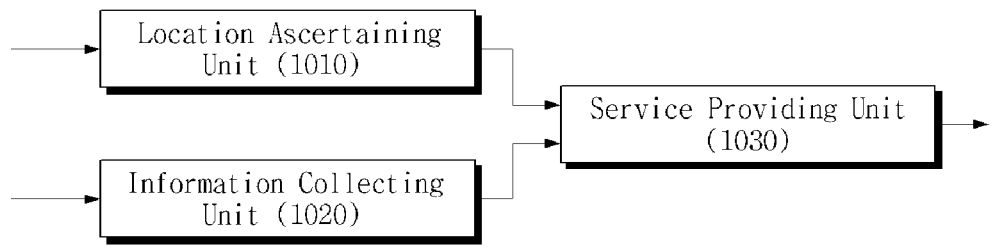
FIG. 10 is a block diagram illustrating a location-based service providing apparatus, according to an exemplary embodiment.

FIG. 10 illustrates a location-based service providing apparatus, according to an exemplary embodiment.

The location-based service providing apparatus may be included in the server 910 (see FIG. 9). The apparatus may comprise a location ascertaining unit 1010, an information collecting unit 1020, and a service providing unit 1030.

The location ascertaining unit 1010 searches for mobile terminals which are within a predetermined range from a user's mobile terminal. For example, the location ascertaining unit 1010 may search for a mobile terminal which wants to receive a service, and for example, a predetermined number of other mobile terminals within the predetermined range of the mobile terminal wanting the service.

The information collecting unit 1020 collects status information of the found other mobile terminals. For example, status information may comprise emotion status, service connection status, relationship type, the type of program currently being executed, and the like.

Service providing unit 1030 provides display data to display, for example, relative locations of the other mobile terminals to the mobile terminal which wants to receive the service. The display data may comprise the status information of the other mobile terminals, and/or relative location information of the other mobile terminals.

Figure 11:
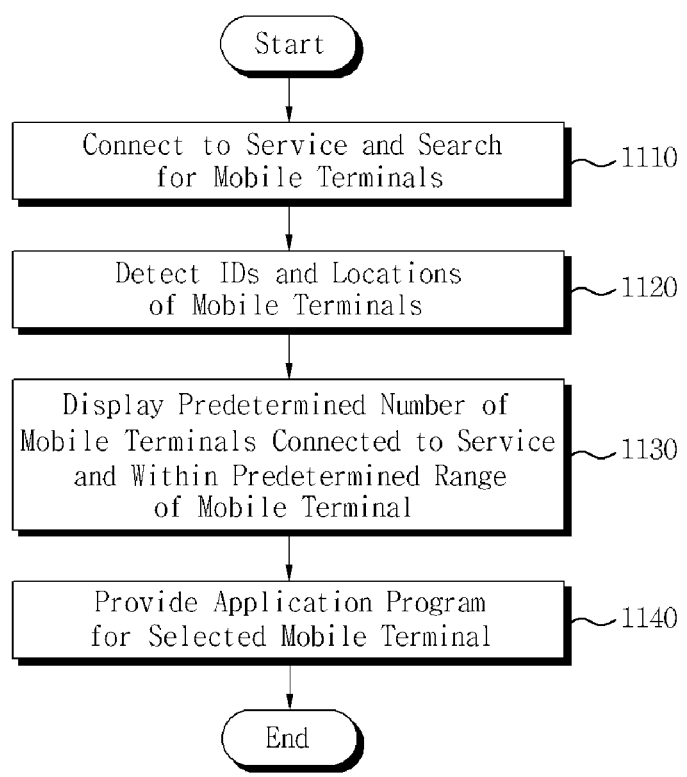
FIG. 11 is a flowchart illustrating a location-based service providing method, according to an exemplary embodiment.

FIG. 11 is a flowchart illustrating a location-based service providing method, according to an exemplary embodiment.

In operation 1110, a mobile terminal is connected to a service and other mobile terminals nearby the mobile terminal are searched. In operation 1120, an ID or location of the mobile terminal is recognized and status information of the other mobile terminals are collected. In operation 1130, a predetermined number of mobile terminals which are within a predetermined range from the user's mobile terminal and which are connected to the service are displayed on a display. An exemplary display screen is illustrated in FIG. 2. In operation 1140, an execution menu for executing an application program for a selected mobile terminal is provided on a display.

Figure 12:
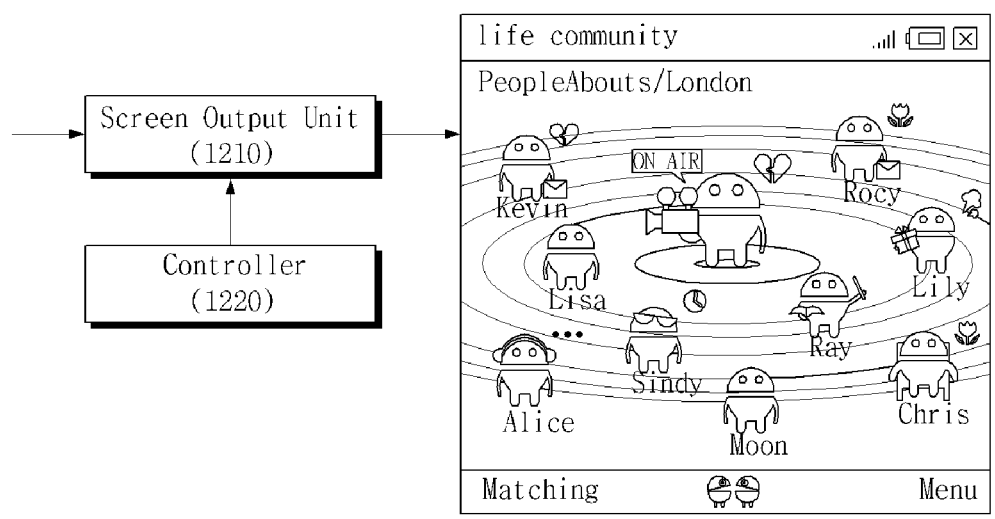
FIG. 12 is a diagram and a display illustrating a configuration of a location-based service receiving apparatus, according to an exemplary embodiment.

FIG. 12 is a diagram and a display illustrating a configuration of a location-based service receiving apparatus, according to an exemplary embodiment.

The location-based service receiving apparatus may be included in a mobile terminal, and includes a screen output unit 1210 and a controller 1220. The screen output unit 1210 receives display data that comprises, for example, status information and/or relative location information of a predetermined number of other mobile terminals which are within a predetermined range of the mobile terminal The display data may be displayed on a screen or display as illustrated in FIG. 12. The display data may be inputted into the other mobile terminals by users of the other mobile terminals. The controller 1220 controls a process of providing the display data of the other mobile terminals to the mobile terminal.

Figure 13:
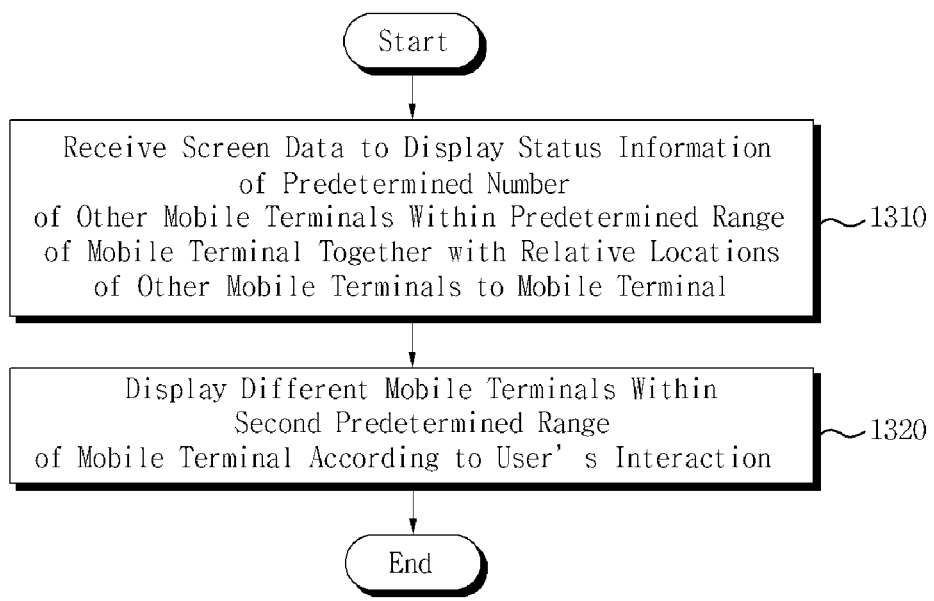
FIG. 13 is a flowchart illustrating a location-based service receiving method, according to an exemplary embodiment.

FIG. 13 is a flowchart illustrating a location-based service receiving method, according to an exemplary embodiment.

In operation 1310, display data comprising status information and/or relative location information of, for example, a predetermined number of other mobile terminals within a predetermined range of a mobile terminal, is received. In operation 1320, other mobile terminals within a second predetermined range of the mobile terminal are displayed according to an interaction of the user of the mobile terminal. According to the user's selection, display data of other mobile terminals which are within the second predetermined range of the mobile terminal, may be displayed on a display.

Status information may include service connection statuses and/or relationship types, and the other mobile terminals may be displayed in different forms according to the service connection statuses or closeness levels. In addition, user emotion information, which may be set by the users of the other mobile terminals, and an application program selection menu for interactions with other mobile terminals, may also be displayed.

According to examples(s) described above, by labeling mobile terminals geographically within a predetermined range of a user's location using icons and visual indicators based on user information of the corresponding mobile terminals, an interface allowing networking while getting to know unfamiliar people may be provided.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. As a non-exhaustive illustration only, a mobile terminal device described herein may refer to mobile devices such as a cellular phone, a personal digital assistant (PDA), a digital camera, a portable game console, and an MP3 player, a portable/personal multimedia player (PMP), a handheld e-book, and a global positioning system (GPS) navigation.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing a location-based service using location information of a mobile terminal, the method comprising:

searching for second mobile terminals within a predetermined first range of a first mobile terminal, and collecting status information of one or more second mobile terminals that are found;

providing display data to the first mobile terminal, the display data comprising relative location information together with the status information of the one or more second mobile terminals, and the status information including emotion information of a user or users of the one or more second mobile terminals and relationship types between the one or more second mobile terminals and the first mobile terminal; and displaying the relative location information in the first mobile terminal together with the relationship types of the one or more second mobile terminals, the relationship types including at least a first type of those who are acquaintances of a user of the first mobile terminal and a second type of those who are not acquaintances of the user, the relative location information of the one or more second mobile terminals of both relationship types being displayed together on the first mobile terminal with the relationship types indicating whether the one or more second mobile terminals belongs to the first type or the second type.

2. The method of claim 1, wherein the status information further includes service connection statuses between the one or more second mobile terminals found and the first mobile terminal, and the one or more second mobile terminals found are displayed in different forms according to the service connection statuses or the relationship types.

3. The method of claim 2, wherein the service connection statuses or the relationship types are distinguished by using different colors.

4. The method of claim 1, further comprising providing data to display the emotion information of the user or users of the one or more second mobile terminals found, wherein the emotion information is set by the user or users of the one or more second mobile terminals found.

5. The method of claim 4, wherein the emotion information is distinguished by using different icons.

6. The method of claim 1, further comprising providing data to display information about one or more programs which are being executed on the one or more second mobile terminals found.

7. The method of claim 1, further comprising providing data to provide a menu on the first mobile terminal, the menu adapted to allow a user to select an application program for an interaction with the one or more second mobile terminals found.

8. The method of claim 1, further comprising, in response to selecting at least one mobile terminal from among the one or more second mobile terminals found, providing information to the first mobile terminal about the at least one selected mobile terminal.

9. The method of claim 1, further comprising:

searching, according to a user's selection of the first mobile terminal, for third mobile terminals which are within a second range of the first mobile terminal, the second range being larger than the first range, and collecting status information of one or more third mobile terminals that are found; and providing display data to the first mobile terminal, the display data comprising relative location information together with the status information of the one or more third mobile terminals found.

10. The method of claim 4, wherein the emotion information provided to the first mobile terminal is displayed on the first mobile terminal as an icon representing emotional status of the user or users of the one or more second mobile terminals.

11. The method of claim 1, wherein the displaying of the relative location information together with the relationship types of the one or more second mobile terminals involves displaying the one or more second mobile terminals of those who are acquaintances of the user of the first mobile terminal in a different color from the one or more second mobile terminals of those who are not acquaintances of the user of the first mobile terminal.

12. A method of receiving a location-based service using location information of a mobile terminal, the method comprising:
   requesting by a first mobile terminal, the location-based service;
   receiving by the first mobile terminal, display data corresponding to one or more other mobile terminals, the display data comprising data to display relative location information together with status information of the one or more other mobile terminals, and the status information comprising emotion information of a user or users of the one or more other mobile terminals and relationship types between the one or more other mobile terminals and the first mobile terminal; and
   displaying the relative location information in the first mobile terminal together with the relationship types of the one or more other mobile terminals, the one or more other mobile terminals being within a first predetermined range of the first mobile terminal,
   wherein the relationship types include at least a first type of those who are acquaintances of a user of the first mobile terminal and a second type of those who are not acquaintances of the user, the relative location information of the one or more other mobile terminals of both relationship types being displayed together on the first mobile terminal with the relationship types indicating whether the one or more other mobile terminals belongs to the first type or the second type.

13. The method of claim 12, further comprising receiving by the first mobile terminal, display data corresponding to one or more other mobile terminals within a second predetermined range of the first mobile terminal, the display data comprising data to display relative location information together with status information of the one or more other mobile terminals within the second predetermined range of the first mobile terminal.

14. The method of claim 12, wherein the status information further comprises service connection statuses between the one or more other mobile terminals and the first mobile terminal, and the method further comprises displaying the one or more other mobile terminals in different forms according to the service connection statuses or the relationship types.

15. The method of claim 12, further comprising displaying the emotion information of the user or users of the one or more other mobile terminals, wherein the emotion information is set by the user or users of the one or more other mobile terminals.

16. The method of claim 12, further comprising displaying a menu to select an application program for an interaction with the one or more other mobile terminals.

17. The method of claim 15, wherein the emotion information of the user or users of the one or more other mobile terminals is displayed as an icon on the first mobile terminal.

18. The method of claim 12, wherein the displaying of the relative location information together with the relationship types of the one or more other mobile terminals involves displaying the one or more other mobile terminals of those who are acquaintances of the user of the first mobile terminal in a different color from the one or more other mobile terminals of those who are not acquaintances of the user of the first mobile terminal.

19. An apparatus configured to provide a mobile terminal a location-based service using location information of another mobile terminal, the apparatus comprising:
   a location ascertaining unit to search other mobile terminals within a predetermined range of the mobile terminal;
   an information collecting unit to collect status information of one or more other mobile terminals that are found; and
   a service providing unit to provide display data to the mobile terminal, the display data comprising the status information together with relative location information of the one or more other mobile terminals found, the status information comprising emotion information of a user or users of the other mobile terminals and relationship types between the one or more other mobile terminals and the first mobile terminal,
   wherein the apparatus is configured to display the relative location information together with the relationship types of the one or more other mobile terminals, the relationship types including at least a first type of those who are acquaintances of a user of the first mobile terminal and a second type of those who are not acquaintances of the user, the relative location information of the one or more other mobile terminals of both relationship types being displayed together on the first mobile terminal with the relationship types indicating whether the one or more mobile terminals belongs to the first type or the second type.

20. An apparatus configured to allow a mobile terminal to receive a location-based service using location information of another mobile terminal, the apparatus comprising:
   a screen outputting unit to receive display data, the display data comprising display status information together with relative location information of one or more other mobile terminals within a first predetermined range of the mobile terminal, the status information including relationship types with respect to the one or more other mobile terminals, and to display a display corresponding to the display data including the relative location information together with the relationship types, the display including an icon corresponding to emotion information of a user of the another mobile terminal, and the relationship types including at least a first type of those who are acquaintances of a user of the first mobile terminal and a second type of those who are not acquaintances of the user, the relative location information of the one or more other mobile terminals of both relationship types being displayed together on the first mobile terminal with the relationship types indicating whether the one or more second mobile terminals belongs to the first type or the second type; and
   a controller to control a process of providing the display data.

21. The apparatus of claim 20, wherein the screen outputting unit receives display data corresponding to one or more other mobile terminals within a second predetermined range of the first mobile terminal, the display data comprising data to display relative location information together with status information of the one or more other mobile terminals within the second predetermined range of the first mobile terminal.

* * * * *